(12) United States Patent
Negulescu et al.

(10) Patent No.: US 10,378,372 B2
(45) Date of Patent: Aug. 13, 2019

(54) TURBINE WITH COOLED TURBINE GUIDE VANES

(71) Applicant: Rolls-Royce Deutschland Ltd & Co KG, Blankenfelde-Mahlow (DE)

(72) Inventors: Dimitrie Negulescu, Berlin (DE); Jens Taege, Schoeneiche (DE); Joana Negulescu, Berlin (DE); Knut Lehmann, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 378 days.

(21) Appl. No.: 15/215,726

(22) Filed: Jul. 21, 2016

(65) Prior Publication Data

US 2017/0022836 A1      Jan. 26, 2017

(30) Foreign Application Priority Data

Jul. 21, 2015  (DE) .......................... 10 2015 111 843

(51) Int. Cl.
  *F01D 5/08*   (2006.01)
  *F01D 9/04*   (2006.01)
  (Continued)

(52) U.S. Cl.
  CPC ............. *F01D 9/041* (2013.01); *F01D 5/081* (2013.01); *F01D 5/187* (2013.01); *F01D 5/188* (2013.01); *F01D 25/12* (2013.01); *F01D 25/24* (2013.01); *F05D 2220/32* (2013.01); *F05D 2260/20* (2013.01); *F05D 2260/2212* (2013.01); *Y02T 50/673* (2013.01); *Y02T 50/676* (2013.01)

(58) Field of Classification Search
  CPC .......... F01D 5/081; F01D 5/082; F01D 5/187; F01D 5/188; F01D 9/041; F01D 25/12; F01D 25/24; F05D 2260/205
  See application file for complete search history.

(56) References Cited

U.S. PATENT DOCUMENTS 3,291,447 A    12/1966  Brandon
3,791,758 A    2/1974   Jenkinson
(Continued)

FOREIGN PATENT DOCUMENTS

DE    1255113 B      11/1967
DE    2065334 A1     4/1973
(Continued)

OTHER PUBLICATIONS

European Search Report dated Jan. 2, 2017 for counterpart European Application No. 16175769.5.
(Continued)

*Primary Examiner* — Richard A Edgar
(74) *Attorney, Agent, or Firm* — Shuttleworth & Ingersoll, PLC; Timothy Kilma

(57) ABSTRACT

A turbine, in particular a high-pressure turbine, for an aircraft engine, with a housing at which turbine guide vanes are circumferentially arranged, wherein the turbine guide vanes have at least one interior space through which cooling air flows during operation of the turbine. At least one turbine guide vane has a cooling air passage in the area of an inner wall with respect to the radial direction of the turbine, via which the interior space of the turbine guide vane can be supplied with cooling air.

14 Claims, 3 Drawing Sheets

(51) Int. Cl.
*F01D 5/18* (2006.01)
*F01D 25/12* (2006.01)
*F01D 25/24* (2006.01)

(56) References Cited

U.S. PATENT DOCUMENTS

| | | | | |
|---|---|---|---|---|
| 4,666,368 A | * | 5/1987 | Hook, Jr. | F01D 5/082 |
| | | | | 415/115 |
| 4,820,116 A | * | 4/1989 | Hovan | F01D 1/32 |
| | | | | 415/115 |
| 6,290,464 B1 | | 9/2001 | Negulescu et al. | |
| 6,357,999 B1 | * | 3/2002 | Pearce | F01D 5/08 |
| | | | | 415/115 |
| 7,527,470 B2 | | 5/2009 | Guimbard et al. | |
| 7,921,654 B1 | | 4/2011 | Liang | |
| 8,282,342 B2 | * | 10/2012 | Tonks | F01D 9/065 |
| | | | | 415/116 |
| 2002/0148214 A1 | | 10/2002 | Tiemann | |
| 2007/0101722 A1 | | 5/2007 | Hoffmann | |
| 2014/0219815 A1 | | 8/2014 | Kohli et al. | |
| 2015/0030461 A1 | * | 1/2015 | Mugglestone | F01D 5/188 |
| | | | | 416/97 R |

FOREIGN PATENT DOCUMENTS

| | | |
|---|---|---|
| DE | 3712628 A1 | 11/1987 |
| DE | 69909585 T2 | 4/2004 |
| DE | 602005000350 T2 | 10/2007 |
| EP | 1004748 A2 | 5/2000 |
| EP | 1013882 A2 | 6/2000 |
| EP | 1921270 A2 | 5/2008 |
| EP | 2725191 A1 | 4/2014 |
| WO | WO2012028424 A1 | 3/2012 |

OTHER PUBLICATIONS

German Search Report dated Jul. 21, 2015 for counterpart German Application No. 10 2015 111 843.2.

* cited by examiner

TURBINE WITH COOLED TURBINE GUIDE VANES

This application claims priority to German Patent Application DE102015111843.2 filed Jul. 21, 2015, the entirety of which is incorporated by reference herein.

The invention relates to a turbine, in particular a high-pressure turbine, for an aircraft engine, with turbine guide vanes that are arranged inside a housing, according to the kind as it is more closely disclosed herein.

Known from practice are high-pressure turbines of aircraft engines with turbine guide vanes that are arranged in a circumferential manner inside a turbine housing, with the turbine guide vanes being cooled. For this purpose, the turbine guide vanes that together form a guide vane ring (NGV) are supplied with cooling air, for example from one of the last stages of a high-pressure compressor, wherein the cooling air is first supplied from the outside via pipelines to an annular chamber at the turbine housing that is assigned to the guide vane ring and that is arranged in the radial direction substantially outside of the nozzle guide vanes. Cooling air is supplied into the annular chamber via individual circumferentially distributed pipelines, wherein the annular chamber has an opening for each turbine guide vane via which cooling air is guided into an interior space of the turbine guide vane and flows out of the guide vane via outlet openings in the area of a rear edge with respect to the axial direction of the guide vane.

During operation of such aircraft engines, a cross-flow of cooling air may occur in the circumferential direction in the area of the annular chamber, which disadvantageously results in a non-uniform cooling of the individual turbine guide vanes. In addition, the arrangement of the pipelines for guiding of cooling air from a compressor housing to the turbine housing requires a large installation space, and the known solutions are disadvantageously characterized by an undesirably high weight with a correspondingly high specific fuel consumption, which in turn leads to an undesirably high share of nitric oxides in the exhaust gas flow.

Another problem in known embodiments is that a gap between the guide vane ring and the rotor devices that are arranged in front and behind the guide vane ring in the axial direction, through which gap so-called sealing air is guided for sealing purposes, changes in an undesirable manner with respect to dimensions and shape due to the respective thermal expansion coefficients. Thus, the functionality of a turbine gap control system is compromised with regard to the axial and the radial gap.

It is an object of the invention to design a turbine for an aircraft engine of the kind as it has been described more closely above in such a manner that it ensures an efficient cooling of the turbine guide vanes in a robust, cost-effective and weight-optimized manner.

The object is solved with a turbine that is embodied according to features as disclosed herein.

Thus, a turbine, in particular a high-pressure turbine, for an aircraft engine is provided, comprising a housing at which turbine guide vanes or nozzle guide vanes are circumferentially arranged, wherein the turbine guide vanes have at least one interior space through which cooling air flows during operation of the turbine. According to the invention, it is suggested that at least one turbine guide vane has a cooling air passage in the area of an inner wall, as viewed in the radial direction of the turbine, via which the interior space of the turbine guide vane can be supplied with cooling air for the purpose of cooling the turbine guide vane during operation of the turbine.

The turbine embodied according to the invention has the advantage that no external pipelines for supplying the turbine guide vanes are necessary in order to supply the turbine guide vanes with cooling air to a desired extent during operation of the turbine. Because of this, the suggested turbine can be configured so as to be lighter as compared to a conventionally embodied turbine that has a cooling air supply via outer pipelines. In addition, cover plates as they are used with conventionally embodied turbines are not necessary in the solution according to the invention.

As a result of the reduced weight, an aircraft engine that is embodied with a turbine according to the invention can be operated with low specific fuel consumption, so that the exhaust gas flow contains a reduced share of nitric oxides. In addition, the turbine according to the invention can be efficiently cooled through a robust, interference-insensitive design, whereby the service life of the turbine is prolonged as compared to conventional turbines.

The nozzle guide vanes of the turbine according to the invention that can principally be used independently of any stage are cooled in particular via a cooling air flow of a secondary air system, which is extracted during operation of the aircraft engine preferably in the area of one of the last stages of a high-pressure compressor. At that, the cooling air flow is in particular guided through an annular space that is arranged below the blade platforms of a rotor device, which, seen in axial direction of the turbine, are arranged in front of the turbine guide vanes that form a nozzle guide vane ring. The annular space is delimited in the axial direction of the turbine at least in certain parts by the rotor device and the nozzle guide vanes. From the annular space, the cooling air flow is supplied to a so-called sealing air ring space that is arranged below the inner wall of the turbine guide vanes with respect to the radial direction of the turbine. Here, the pressure conditions in the cooling air flow or the turbulence swirls of the cooling air flow can be adjusted in such a manner that, apart from cooling the guide vanes, also the gap between the blade platforms of the rotor device and the inner wall of the turbine guide vanes is sealed.

The turbine according to the invention is particularly suitable for cooling the turbine guide vanes via a secondary air system, in which no sealing plates are provided in the area of the cooling channels in the area of a circumferential surface of the rotor blades of the rotor device that is formed by a disk rim. At that, the pressure conditions required for cooling the turbine guide vanes can be adjusted in a simple manner.

In an advantageous embodiment of the turbine according to the invention, it is provided that the cooling air passage has a geometry that forms a diffuser channel. The provision of a diffuser channel with a flow delay that is caused by its geometry advantageously results in an efficient turbine guide vane cooling without undesirably high pressure losses. The pressure recovery in the area of the cooling air passage that can be achieved by the delay facilitates an efficient interior cooling of the respective turbine guide vane, wherein cooling air can be blown out in a reliable manner also in areas with high counter pressure. In this manner, the service life of the turbine can be further prolonged in an advantageous manner.

The cooling air passage that forms a diffuser channel preferably has a cross-sectional surface that expands in a diffuser-like manner in the flow direction, whereby a delay channel is created in a constructionally simple manner.

In an advantageous embodiment of the cooling air passage, the center axis of the same is bent from an air inlet in the direction of an air outlet, wherein the center axis extends in the area of the air outlet substantially in the radial direction of the turbine. In this manner, a flow velocity of a cooling air flow is decelerated in the area of the cooling air passage and the static pressure is constantly increased, which ultimately leads to an improved cooling of the turbine guide vanes.

The geometric design of the air inlet is carried out expediently in such a way that the aerodynamic entry surface is optimized in the design point with respect to the absolute velocity of the incident flow, so that a mostly loss-free inflow into the cooling air passage may occur. Thus, in the area of the air inlet, the cooling air passage is aligned to a desired extent with the turbulence swirl flow that is present during operation of the turbine, so that the cooling air flow enters the cooling air passage with as little pressure loss as possible and the highest possible efficiency is achieved. For this purpose, the center axis of the cooling air passage extends in the area of the air inlet in a direction which is at least approximately aligned with the cooling air inflow direction.

In an advantageous embodiment of the turbine according to the invention, it is provided that, in the area of the air inlet, the cooling air passage is delimited by two lateral surfaces in the circumferential direction of the turbine, with the distance of these surfaces increasing in the circumferential direction of the turbine from the air inlet in the direction of an air outlet. Advantageously, a flow that is supplied to the cooling air passage is disturbed here only to a small degree. Between the lateral surfaces, the air inlet can in particular be formed by an area of the inner wall which is embodied in a ramp-like manner.

The cooling air inlet is preferably embodied as a so-called flat NACA intake. Alternatively or additionally to this, the cooling air passage can have an inlet lip in the area of the air inlet, with the inlet lip in particular protruding in certain areas as a projection beyond the inner wall of the turbine guide vane in the radial and/or the axial direction of the turbine, and thus projecting counter to a flow during operation of the turbine.

In an advantageous embodiment of the invention, the air inlet of the cooling air passage can also form a frontal intake, wherein the air inlet is preferably embodied in a Pitot-like manner.

The cooling air passage is preferably embodied in the kind of a so-called scoop, but the person skilled in the art can also choose shorter shapes, depending on the application case, e.g. in the kind of a semi scoop.

Principally, the cooling air conduction in the interior space of the turbine guide vane can be embodied in any desired manner, wherein, in an advantageous embodiment, an insert for impingement cooling can be arranged in the interior space of the turbine guide vane that during operation of the turbine can be supplied with a cooling air flow through the cooling air passage. The insert can have multiple cooling outlets via which the cooling air flow can be conducted out of the turbine guide vane in the area of a rear edge of the turbine guide vane.

In order to obtain a pressure comprising a static component and a dynamic turbulence swirl component that is sufficiently strong for cooling the turbine guide vanes in a simple manner, a rotor device, such as for example a stage-I rotor, is arranged upstream of the nozzle guide vanes in an advantageous embodiment of the turbine according to the invention, wherein the blade roots of rotor blades of this rotor device have at least one passage for guiding a cooling air flow into an annular space in front of the cooling air passage. Here, the passages that can for example be embodied as micro-turbines can extend substantially in the axial direction of the turbine.

In addition to the at least one such passage, the blade roots of the rotor blades can further have at least one additional channel for guiding a cooling air flow through the blade roots in the axial direction of the turbine, wherein such a channel can also be a micro-turbine and preferably forms a so-called turbulence swirl reduction channel, by means of which the desired pressure conditions can be achieved in the annular space or in the sealing air ring space in a simple manner during operation of the aircraft engine.

Apart from the mentioned combinations of features also the features that are specified in the patent claims as well as the features that are specified in the following exemplary embodiment are respectively suitable on their own or in any combination with each other to further develop the subject matter according to the invention.

Other advantages and embodiment options of the turbine according to the invention also follow from the patent claims and the exemplary embodiment that are described in principle in the following by referring to the drawing.

Herein:

Figure 1:
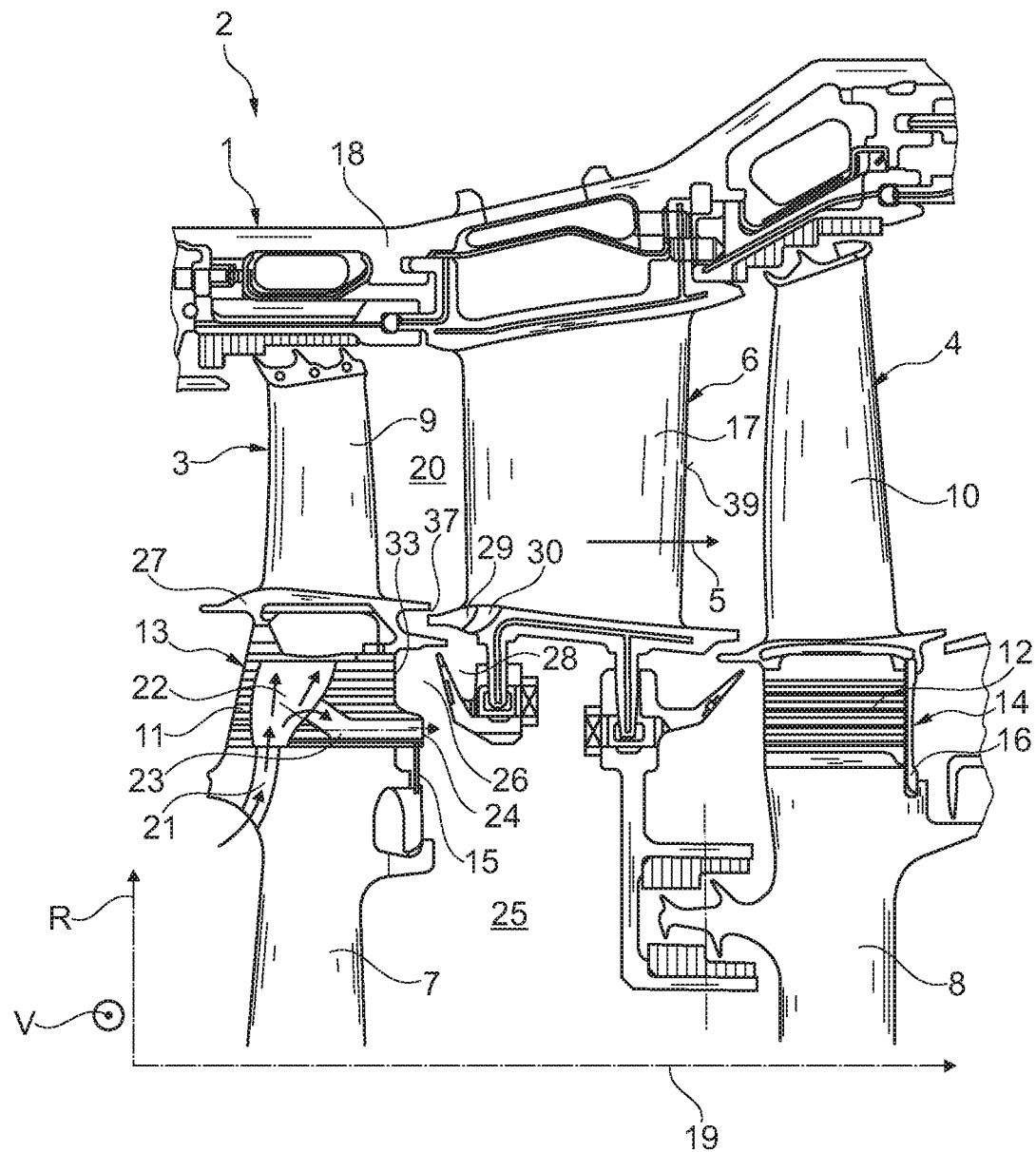
FIG. 1 shows a partial longitudinal section through a two-stage high-pressure turbine, wherein turbine guide vanes that are arranged at a turbine housing can be seen.
Figure 2:
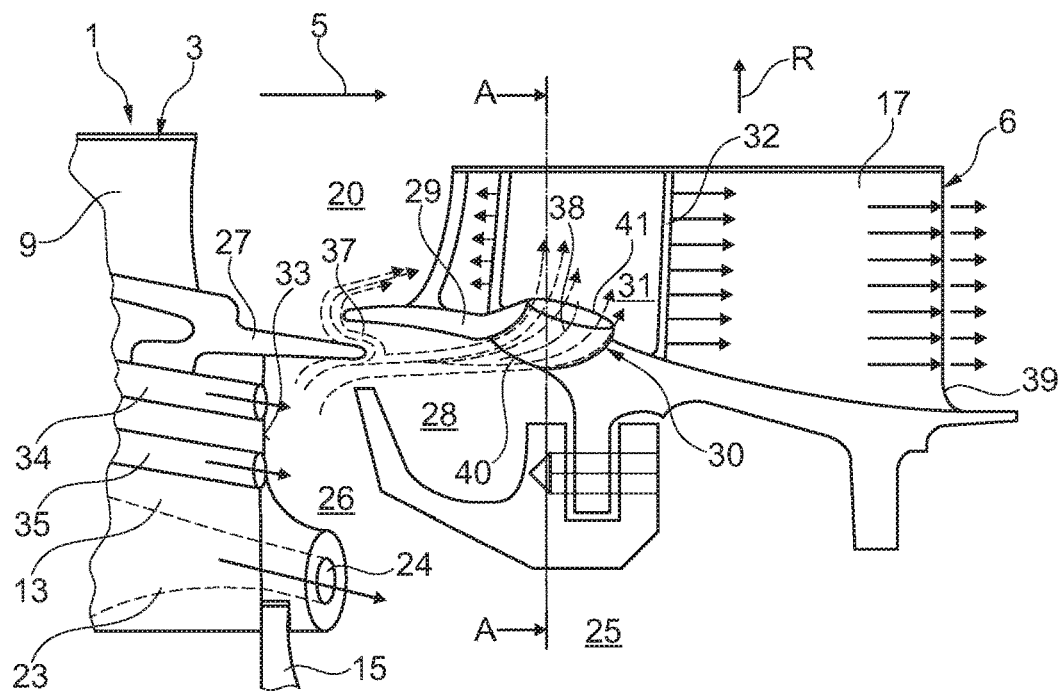
FIG. 2 shows a simplified view of a section of FIG. 1, wherein a cooling air passage can be seen in more detail, via which cooling air can be supplied to an interior space of a turbine guide vane.
Figure 3:
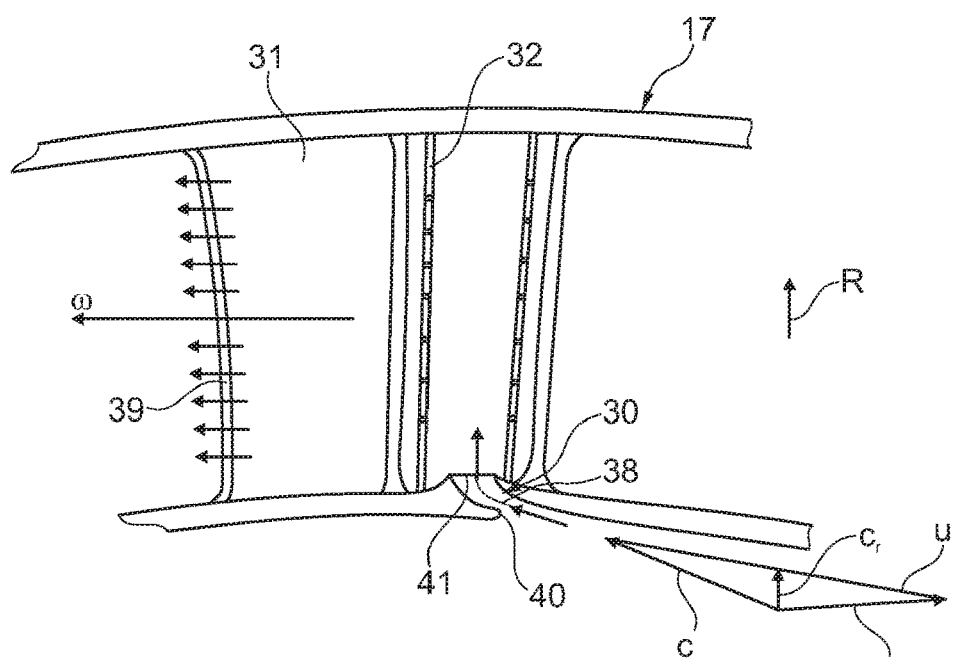
FIG. 3 shows a sectional view according to line A-A in FIG. 2.

Referring to FIG. 1 to FIG. 3, what can be seen are respectively different sections of a high-pressure turbine 1 for an aircraft engine 2 or jet engine, which has a stage-I rotor device 3 and a stage-II rotor device 4 that is arranged downstream in the flow direction 5 of a working gas. A turbine nozzle guide vane ring 6 is arranged between the rotor devices 3 and 4 in the axial direction A of the turbine 1.

The rotor devices 3, 4 have respectively one disk wheel 7 or 8 and a plurality of turbine rotor blades 9 or 10 that are circumferentially in operative connection with the disk wheel 7 or 8, wherein the rotor blades 9 or 10 mesh with respectively one blade root 13 or 14 that is configured with a fir-tree-shaped profile 11 or 12 with correspondingly profiled disk fingers of the disk wheel 7 or 8. To avoid an axial displacement, the rotor blades 9 or 10 are secured by a suitably designed locking ring 15 or a closing plate 16 that is secured at the rotor disk or the disk wheel 7 or 8.

The turbine nozzle guide vane ring 6 has a plurality of turbine guide vanes 17 that are respectively arranged at a turbine housing 18 of the axial-flow turbine 1 in a manner so as to be distributed in the circumferential direction U of the turbine 1. Further, reference sign 19 indicates the rotational axis of the turbine 1 around which the rotor devices 3, 4, which are connected to each other in a manner that is not shown here, rotate.

In the area of an annular channel 20, in which the rotor blades 9, 10 of the rotor devices 3, 4 as well as the turbine guide vanes 17 of the turbine guide vane 6 extend, the working gas flows in the flow direction 5 during operation of the aircraft engine. Due to the high temperatures of the working gas, the rotor blades 9, 10 as well as the turbine guide vanes 17 are air-cooled in the present case.

For cooling purposes, in particular a cooling air flow of a secondary air system, a so-called internal cooling air flow, is supplied from a compressor that is located upstream of the turbine 1. Here, the cooling air flow is supplied via a supply duct 21, which extends inside the disk wheel 7 and which ends in the area of a front face of the disk wheel 8 with respect to the flow direction 5, to a cooling air chamber 22, which is in an operative connection to cooling channels that are located inside the rotor blades 9, 10 and are not depicted here in any more detail.

In addition, a further cooling air channel or passage 23 branches off from the cooling air chamber 22 that extends completely inside the blade root 13 and ends at a backside 33 of the blade root 13 as viewed in the flow direction 5. The cooling air channel 23 is connected via a nozzle outlet opening 24 to the inter stage space 25 between the two rotor devices 3, 4, which is mostly referred to as an inter stage cavity, so that a part of the cooling air flow that is supplied to the rotor device 3 reaches the inter stage cavity 25 through the cooling air channel 23. From here, it is guided to the rotor blades 10 of the stage-II rotor device 4, among other locations.

A part of the cooling air flow that is supplied to the inter stage cavity 25 is conducted—as can be seen in more detail in FIG. 2—to an annular space 26, which is arranged below the blade platforms of the rotor blades 9. The annular space 26 is delimited in the flow direction 5 by the rotor device 3, on the one side, and by the turbine nozzle guide vane ring 6, on the other.

In addition, two supply channels 34, 35 that are integrated into the blade root 13 can optionally be provided, via which cooling air can be supplied to the annular space 26 for turbulence swirl reduction.

In the area of the annular space 26, a pressure is increased as compared to conventional embodiments by in particular more than 10%, in the present case from 16 bar to 18 bar, during operation of the aircraft engine 2. The annular space 26 is also in operative connection with a so-called sealing air ring space 28, which is arranged below an inner wall 29 of the turbine guide vanes 17 with respect to the radial direction R of the turbine 1.

Apart from cooling the turbine guide vanes 17, a part of the cooling air flow is also used in the area of the sealing air ring space 28 as so-called sealing air for the purpose of sealing a gap 37 between the blade platforms 27 of the rotor device 3 and the inner wall 29 of the turbine guide vanes 17 in order to prevent hot working gas from entering the sealing air ring space 28 from the annular channel 20.

For cooling the turbine guide vanes 17, the cooling air flow is guided, respectively via a cooling air passage 30 that is provided in the area of the inner wall 29 of the turbine guide vanes 17, from the sealing air ring space 28 into an interior space 31 of the turbine guide vanes 17, and in the present case is conducted through an insert 32 for impingement cooling into the direction of a rear edge 39 of the turbine guide vanes 17 with respect to the flow direction 5, in the area of which the cooling air flow is discharged from the turbine guide vane 17 through so-called effusion holes or outlet openings.

As can be seen in more detail in the view according to FIG. 3, the cooling air flow that is supplied to the cooling air passage 30 has a positive turbulence swirl with respect to the rotational direction of the rotor devices 3, 4 that is indicated by the arrow ω. In the area of the annular space 26, the positive turbulence swirl flow has a swirl number of more than 0.7 in the absolute system, and in the area of the sealing air annular space 28 it has a swirl number of more than 0.5 in the absolute system, so that the swirl number is higher than in an area that is arranged radially outside of the turbine guide vanes and via which the turbine guide vanes are cooled in conventional embodiments.

Due to the swirl numbers that can be achieved with the described construction, it is ensured that the cooling air flow that is flowing from the sealing air ring space 28 and through the cooling air passage 30, enters the interior space 31 of turbine guide vane 17, wherein in addition to the desired cooling air flow also a sealing air flow through the gap 37 is ensured for all interference scenarios.

In order to form a diffuser channel, the cooling air passage 30 has a channel geometry that expands in the flow direction in the manner of a diffuser, so that a cross-sectional area of the cooling air passage 30 expands, in particular in a continuous manner, from an air inlet 40 to an air outlet 41. At that, the channel geometry has a bent, so that a cooling air flow that is supplied to the cooling air passage 30 is deflected substantially in the radial direction R of the turbine 1. As can in particular be seen in FIG. 2 and FIG. 3, the cooling air passage 30 is configured so as to deflect and to decelerate the cooling air flow that is conducted therein, and thus so as to increase the pressure.

In the area of the air inlet 40, a center axis 38 of the cooling air passage 30 is substantially aligned with a flow direction of the supplied cooling air flow, wherein the center axis 38 extends at least approximately in the radial direction R of the turbine 1 in the area of the air outlet 41, so that the cooling air flow is deflected in the area of the cooling air passage 30.

The cooling air flow, which has an absolute velocity c in the area of the sealing air annular space 28, is subjected to a pressure increase in the appropriately aerodynamically designed cooling air passage 30, which results in a significant pressure gain when exiting the cooling air passage. This pressure increase in turn leads to an efficient cooling of the turbine guide vane 17.

In the sectional view according to FIG. 3, the cooling air flow in the area of the sealing air annular space 28 is illustrated in a vectorial manner by means of a velocity triangle. Here, w indicates the relative velocity of the flow, c an absolute velocity of the flow and $c_r$ its radial component, and u indicates a circumferential speed. The circumferential speed u of each point of the rotor devices 3 or 4 can for example be 433 m/s, and the cooling air flow can enter the cooling air inlet 30 with an absolute velocity of 250 m/s, where the cooling air velocity is reduced as the dynamic pressure is increased to e.g. 80 m/s.

Figure 4A:
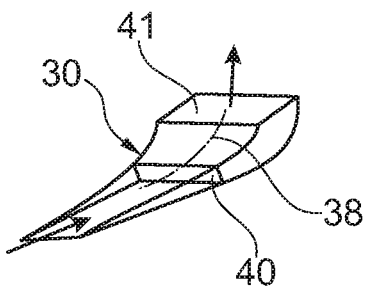
FIG. 4A shows a schematic view of a first geometric embodiment variant of the cooling air passage of FIG. 1 to FIG. 3 as a so-called NACA intake.
Figure 4B:
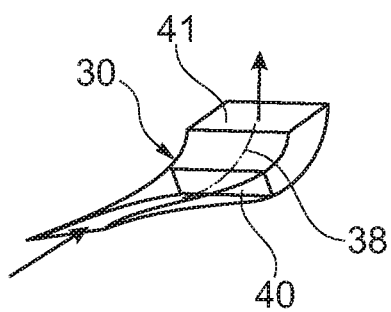
FIG. 4B shows a schematic view of a second geometric embodiment variant of the cooling air passage of FIG. 1 to FIG. 3 as a NACA intake with an inlet lip that projects into the flow.
Figure 4C:
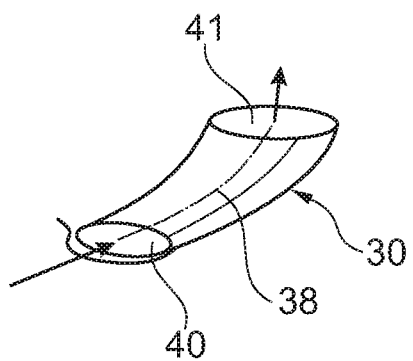
FIG. 4C shows a schematic view of a third geometric embodiment variant of the cooling air passage of FIG. 1 to FIG. 3 as a Pitot-like frontal intake.

FIG. 4A to FIG. 4C show different possible geometries of the cooling air passage 30, wherein a flat NACA intake that is shown in FIG. 4A in principle and that is also referred to as an immersed inlet or a "submerged inlet" is the most advantageous. Here, the cooling air entrance into the cooling air passage 30 is configured as a flat ramp that is integrated into the surface.

Depending on the characteristics of the construction of the turbine guide vane ring 6 and the components of the annular space 26 and of the sealing air ring space 28, also other inflow geometries can be advantageous, such as a NACA intake as it is shown in FIG. 4B with an inlet lip that is protruding into the flow and with a larger air inlet 40 than in the conventional NACA embodiment according to FIG. 4A, or, as is shown in FIG. 4C, a Pitot-like frontal intake with a round cross-section, which is also referred to as a scoop intake.

PARTS LIST 1 turbine
2 aircraft engine
3 stage-I rotor device
4 stage-II rotor device
5 flow direction
6 turbine nozzle guide vane ring
7 disk wheel
8 disk wheel
9 rotor blade
10 rotor blade
11 fir-tree-shaped profile
12 fir-tree-shaped profile
13 blade root
14 blade root
15 locking ring
16 closing plate
17 turbine guide vane
18 turbine housing
19 rotational axis
20 annular channel
21 supply duct
22 cooling air chamber
23 cooling air channel
24 nozzle outlet opening
25 inter stage space, inter stage cavity
26 annular space
27 blade platform
28 sealing air ring space
29 inner wall of the turbine guide vane
30 cooling air passage, diffuser channel
31 interior space of the turbine guide vane
32 insert for impingement cooling
33 backside of the blade root
34 supply channel
35 supply channel
37 gap
38 center axis of the cooling air passage
39 rear edge of the turbine guide vane
40 air inlet of the cooling air passage
41 air outlet of the cooling air passage
R radial direction
U circumferential direction
c absolute velocity
$c_r$ radial component
u circumferential speed
w relative velocity
ω rotational speed

The invention claimed is:

1. A turbine for an aircraft engine comprising:
a housing;
a turbine guide vane arranged inside the housing, wherein the turbine guide vane includes an interior space through which cooling air flows during operation of the turbine;
the turbine guide vane including an inner wall;
an annular space adjacent to the inner wall of the turbine guide vane;
a cooling air passage, wherein the cooling air passage includes an air inlet and an air outlet through which the interior space of the turbine guide vane can be supplied with the cooling air;
wherein the air inlet is located at the inner wall of the turbine guide vane with respect to a radial direction of the turbine, connecting the cooling air passage to the annular space at the inner wall of the turbine guide vane;
wherein the air outlet is located in the interior space of the turbine guide vane to supply the turbine guide vane with the cooling air;
wherein the cooling air passage forms a continuously diffusing channel from the air inlet to the air outlet for diffusing the cooling air.

2. The turbine according to claim 1, wherein the cooling air passage includes a center axis bent from the air inlet in a direction of the air outlet, and wherein the center axis extends in a radial direction of the turbine in an area of the air outlet.

3. The turbine according to claim 1, wherein the cooling air passage is delimited by two lateral surfaces in a circumferential direction of the turbine, with a distance between the two lateral surfaces increasing in the circumferential direction of the turbine from the air inlet in a direction of the air outlet.

4. The turbine according to claim 1, wherein the air inlet is configured as a NACA duct.

5. The turbine according to claim 1, wherein the air inlet includes an inlet lip.

6. The turbine according to claim 1, wherein the air inlet forms a frontal intake.

7. The turbine according to claim 1, and further comprising an insert for impingement cooling arranged in the interior space of the turbine guide vane.

8. The turbine according to claim 1, further comprising:
a rotor device arranged upstream of the turbine guide vane;
a rotor blade including a blade root, wherein the rotor blade is attached to the rotor device at the blade root;
wherein the blade root includes a passage for guiding the cooling air into the annular space with a turbulence swirl flow in front of the cooling air passage.

9. The turbine according to claim 8, wherein the blade root includes at least one additional supply channel for guiding the cooling air.

10. The turbine according to claim 1, wherein:
the turbine guide vane includes a vane platform;
the inner wall is part of the vane platform; and
the cooling air passage is positioned in the vane platform.

11. A turbine for an aircraft engine, comprising:
a housing;
a turbine guide vane arranged inside the housing, wherein the turbine guide vane includes an interior space through which cooling air flows during operation of the turbine;
the turbine guide vane including an inner wall;
an annular space adjacent to the inner wall of the turbine guide vane;
a cooling air passage, wherein the cooling air passage includes an air inlet and an air outlet through which the interior space of the turbine guide vane can be supplied with the cooling air;

wherein the air inlet is located at the inner wall of the turbine guide vane with respect to a radial direction of the turbine, connecting the cooling air passage to the annular space at the inner wall of the turbine guide vane;

wherein the air outlet is located in the interior space of the turbine guide vane to supply the turbine guide vane with the cooling air;

a rotor device arranged upstream of the turbine guide vane;

a rotor blade including a blade root, wherein the rotor blade is attached to the rotor device at the blade root;

wherein the blade root includes a passage for guiding the cooling air into the annular space with a turbulence swirl flow in front of the cooling air passage;

wherein the blade root includes at least one additional supply channel for guiding the cooling air.

12. The turbine according to claim 11, wherein the cooling air passage includes a center axis bent from the air inlet in a direction of the air outlet, and wherein the center axis extends in a radial direction of the turbine in the air outlet.

13. The turbine according to claim 11, wherein the air inlet of the cooling air passage is configured as a NACA duct.

14. The turbine according to claim 11, wherein the air inlet includes an inlet lip.

* * * * *